US012380375B2

(12) United States Patent
Nogami et al.

(10) Patent No.: US 12,380,375 B2
(45) Date of Patent: Aug. 5, 2025

(54) TASK MANAGEMENT DEVICE, VEHICLE, AND TASK MANAGEMENT METHOD (71) Applicant: TOYOTA JIDOSHA KABUSHIKI KAISHA, Aichi-ken (JP)

(72) Inventors: Hirotaka Nogami, Nisshin (JP); Jun Tsukamoto, Seto (JP); Tsuyoshi Okada, Nagoya (JP); Fumiyuki Kagara, Sagamihara (JP); Kotaro Hirose, Nisshin (JP); Yoshiki Terashima, Okazaki (JP); Yohei Ando, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 246 days.

(21) Appl. No.: 18/307,009

(22) Filed: Apr. 26, 2023

(65) Prior Publication Data
US 2024/0005225 A1   Jan. 4, 2024

(30) Foreign Application Priority Data

Jun. 30, 2022   (JP) ................. 2022-106688

(51) Int. Cl.
*G06Q 10/0631* (2023.01)
*B60W 60/00* (2020.01)
*G06Q 10/02* (2012.01)
*G06Q 10/0834* (2023.01)
*G06Q 50/40* (2024.01)

(52) U.S. Cl.
CPC ... *G06Q 10/0631* (2013.01); *B60W 60/00253* (2020.02); *B60W 60/00256* (2020.02); *G06Q 10/02* (2013.01); *G06Q 10/08345* (2013.01); *G06Q 50/40* (2024.01)

(58) Field of Classification Search
CPC ...... G06Q 10/06; G06Q 10/063; G06Q 10/02; G06Q 10/08345; G06Q 10/0631; G06Q 50/40; B60W 60/00253; B60W 60/00256
See application file for complete search history.

(56) References Cited

U.S. PATENT DOCUMENTS

| 2008/0109289 | A1* | 5/2008 | Vivadelli | G06Q 50/163 |
| | | | | 705/314 |
| 2019/0340851 | A1 | 11/2019 | Tokita et al. | |
| 2021/0107519 | A1* | 4/2021 | Gassmann | G06Q 10/04 |

(Continued)

FOREIGN PATENT DOCUMENTS

| JP | 2019-197283 A | 11/2019 |
| JP | 2020-170456 A | 10/2020 |
| JP | 2021-179934 A | 11/2021 |

OTHER PUBLICATIONS

Tellez, Oscar, et al. "Dial-a-ride problem for disabled people using vehicles with reconfigurable capacity." 20th IFAC World Congress of the International Federation of Automatic Control (IFAC 2017). 2017. (Year: 2017).*

*Primary Examiner* — William S Brockington, III
(74) *Attorney, Agent, or Firm* — HAUPTMAN HAM, LLP (57) ABSTRACT A task management device includes a control unit that executes, when satisfaction of a specific condition is detected during a period in which a vehicle to be operated in a mode corresponding to an application is operated in a first mode, operation start control to start an operation of the vehicle in a second mode that is different from the first mode before a schedule end time of the period.

16 Claims, 3 Drawing Sheets

(56) References Cited

U.S. PATENT DOCUMENTS

| | | |
|---|---|---|
| 2021/0357878 A1 | 11/2021 | Suzuki |
| 2022/0144178 A1* | 5/2022 | Prozzi ................ B60N 2/01516 |
| 2023/0289667 A1* | 9/2023 | Beaurepaire ....... G01C 21/3438 |

* cited by examiner

TASK MANAGEMENT DEVICE, VEHICLE, AND TASK MANAGEMENT METHOD

CROSS-REFERENCE TO RELATED APPLICATION

This application claims priority to Japanese Patent Application No. 2022-106688 filed on Jun. 30, 2022, incorporated herein by reference in its entirety.

BACKGROUND

1. Technical Field

The present disclosure relates to a task management device, a vehicle, and a task management method.

2. Description of Related Art

Japanese Unexamined Patent Application Publication No. 2020-170456 (JP 2020-170456 A) discloses a system for managing vehicles that can be used for multiple applications.

SUMMARY

When a schedule cannot be changed even under the circumstances where the number of products to be sold or articles to be delivered becomes larger than expected in the case where switching of the use of the vehicle, such as changing from a bus to a mobile store vehicle or a delivery vehicle, is scheduled, usability of the system is not sufficient.

An object of the present disclosure is to allow flexible change in a vehicle usage time for each application.

A task management device according to the present disclosure includes a control unit that executes, when satisfaction of a specific condition is detected during a period in which a vehicle to be operated in a mode corresponding to an application is operated in a first mode, operation start control to start an operation of the vehicle in a second mode that is different from the first mode before a schedule end time of the period.

A task management method according to the present disclosure includes executing, when satisfaction of a specific condition is detected during a period in which a vehicle to be operated in a mode corresponding to an application is operated in a first mode, operation start control to start an operation of the vehicle in a second mode that is different from the first mode by a control unit before a schedule end time of the period.

According to the present disclosure, it is possible to flexibly change the vehicle usage time for each application.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings.

In each drawing, the same or corresponding portions are denoted by the same reference signs. In the description of the present embodiment, description of the same or corresponding components will be appropriately omitted or simplified.

Figure 1:
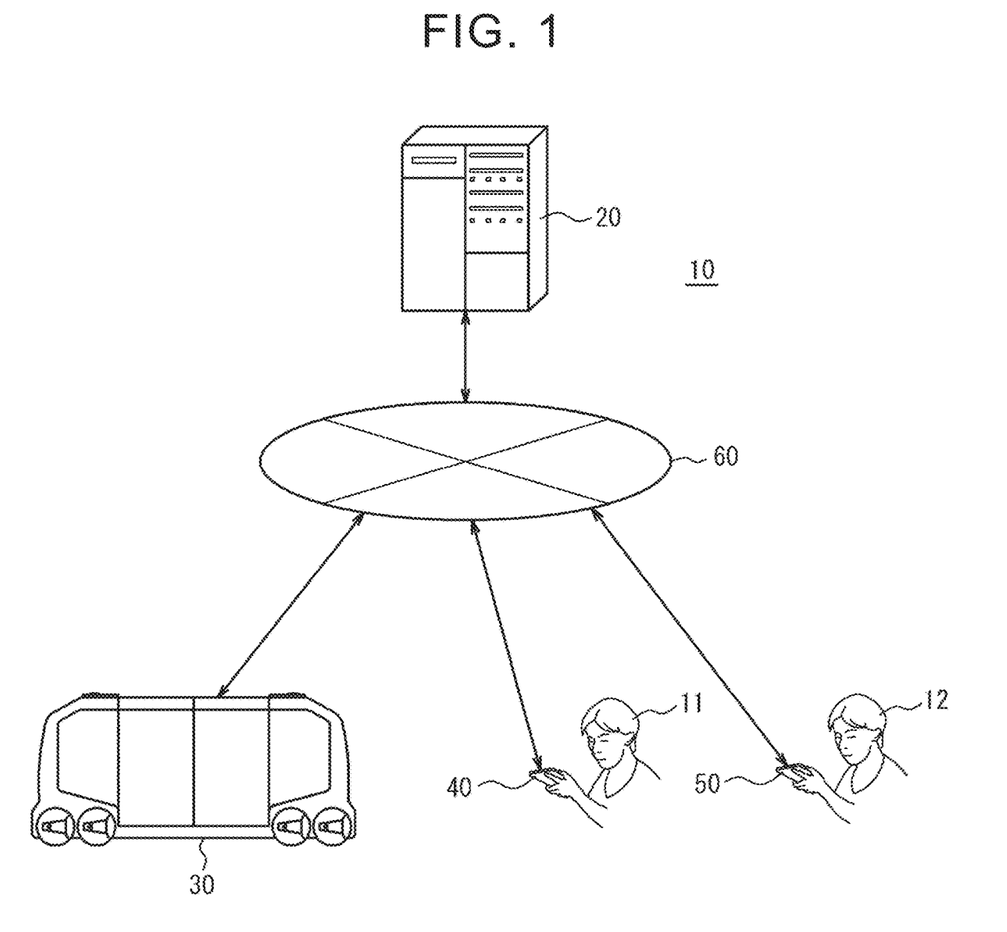
FIG. 1 is a diagram showing a configuration of a system according to an embodiment of the present disclosure.

The configuration of a system 10 according to the present embodiment will be described with reference to FIG. 1.

The system 10 according to the present embodiment includes at least one task management device 20, at least one vehicle 30, at least one first terminal device 40, and at least one second terminal device 50. The task management device 20 can communicate with the vehicle 30, the first terminal device 40, and the second terminal device 50 via a network 60.

The task management device 20 is installed in a facility such as a data center and operated by a business operator that manages the vehicle 30. The task management device 20 is a computer such as a server belonging to a cloud computing system or other computing system.

The vehicle 30 is operated in a mode corresponding to an application, such as delivery of articles, transportation of passengers, sale of products, provision of accommodations, or provision of services requiring appointments. The mode of the vehicle 30 is switched by changing the interior, the exterior, or both. The vehicle 30 is, for example, a mounted vehicle in which rear seats can be freely removed or moved or a table can be freely installed without using tools, by using a dedicated floor structure that utilizes a plurality of rails. For example, the vehicle 30 is equipped with a display such as an LCD or an organic EL as part of the exterior, and can freely change the exterior by switching the contents displayed on the display. The term "LCD" is an abbreviation for "liquid crystal display". The term "EL" is an abbreviation for "electroluminescent". The vehicle 30 may be utilized as an on-demand bus, may be equipped with a power source, lighting, a table, a monitor, or any combination thereof and used as a business meeting space or an office at the destination, or may also be used for other applications such as sale of products, delivery of articles, or provision of administrative services. Changing the interior, the exterior, or both of the vehicle 30 makes it possible to use the vehicle 30 differently depending on the day of the week or the time period.

The vehicle 30 is a vehicle of any type, such as a gasoline vehicle, a diesel vehicle, a hydrogen vehicle, an HEV, a PHEV, a BEV, or an FCEV. The term "HEV" is an abbreviation for "hybrid electric vehicle". The term "PHEV" is an abbreviation for "plug-in hybrid electric vehicle". The term "BEV" is an abbreviation for "battery electric vehicle". The term "FCEV" is an abbreviation for "fuel cell electric vehicle". The vehicle 30 is an AV according to the present embodiment. However, the vehicle 30 may be driven by the driver, or the driving may be automated at any level. The term "AV" is an abbreviation for autonomous vehicle. The level of autonomous driving is, for example, one of levels 1 to 5 in the SAE leveling, for example. The term "SAE" is an abbreviation for the "Society of Automotive Engineers". The vehicle 30 may be a MaaS dedicated vehicle. The term "MaaS" is an abbreviation for "mobility as a service".

The first terminal device 40 is held by a first user 11 or installed at an arbitrary location such as the house or the office of the first user 11 and used by the first user 11. The first terminal device 40 is, for example, a mobile device such as a mobile phone, a smartphone, or a tablet, or a PC. The term "PC" is an abbreviation for "personal computer".

The second terminal device 50 is held by a second user 12 who is different from the first user 11 or installed at an arbitrary location such as the house or the office of the second user 12 and used by the second user 12. The second terminal device 50 is, for example, a mobile device such as a mobile phone, a smartphone, or a tablet, or a PC.

The network 60 includes the Internet, at least one WAN, at least one MAN, or any combination thereof. The term "WAN" is an abbreviation for "wide area network". The term "MAN" is an abbreviation for "metropolitan area network". The network 60 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation for "local area network".

The outline of the present embodiment will be described with reference to FIG. 1.

When the task management device 20 detects that a specific condition Ci is satisfied during a period P1 in which the vehicle 30 is operated in a first mode M1, the task management device 20 executes operation start control before the scheduled end time of the period P1. The operation start control is control to start an operation of the vehicle 30 in a second mode M2 that is different from the first mode M1.

In the present embodiment, under the circumstances where the number of products to be sold or articles to be delivered becomes larger than expected when switching of the use of the vehicle 30, such as changing from a bus to a mobile store vehicle or a delivery vehicle, is scheduled, the vehicle 30 can be started to be used as a mobile shop vehicle or a delivery vehicle earlier than planned. That is, it is possible to flexibly change the vehicle usage time for each application. As a result, the usability of the system 10 is enhanced.

In the present embodiment, the vehicle 30 is used by the first user 11 when the vehicle 30 is operated in the first mode M1. The vehicle 30 is used by the second user 12 when the vehicle 30 is operated in the second mode M2.

On the assumption that the application corresponding to the first mode M1 is the delivery of products such as packages, the first user 11 is a business operator such as a home delivery company, or a delivery staff member. The delivery staff member is on board the vehicle 30 and carries out operations such as loading and unloading the articles, or carrying the articles from the vehicle 30 to the delivery destination. The same as the first user 11 when the application corresponding to the first mode M1 is the delivery of articles applies to the second user 12 when the application corresponding to the second mode M2 is the delivery of articles.

On the assumption that the application corresponding to the first mode M1 is the transportation of passengers, the first user 11 is a business operator such as a bus company or a ride sharing company, or a passenger. The passenger is on board the vehicle 30 and transported. The same as the first user 11 when the application corresponding to the first mode M1 is the transportation of passengers applies to the second user 12 when the application corresponding to the second mode M2 is the transportation of passengers.

On the assumption that the application corresponding to the first mode M1 is the sale of products such as bread, the first user 11 is a business operator such as a mobile vendor, or a sales staff member. The sales staff member is on board the vehicle 30 and sells the products. The same as the first user 11 when the application corresponding to the first mode M1 is the sale of products applies to the second user 12 when the application corresponding to the second mode M2 is the sale of products.

On the assumption that the application corresponding to the first mode M1 is the provision of accommodations, the first user 11 is a business operator such as a hotel company, or a guest. The guest is on board the vehicle 30 and uses the vehicle 30 as the accommodation. The same as the first user 11 when the application corresponding to the first mode M1 is the provision of accommodations applies to the second user 12 when the application corresponding to the second mode M2 is the provision of accommodations.

On the assumption that the application corresponding to the first mode M1 is the provision of medical services, beauty services, or other services requiring appointments, the first user 11 may be a service provider such as a medical institution or a beauty salon, or a service user such as a patient or a customer. The service user is on board the vehicle 30 and uses the service. The same as the first user 11 when the application corresponding to the first mode M1 is the provision of services requiring appointments applies to the second user 12 when the application corresponding to the second mode M2 is the provision of services requiring appointments.

Figure 2:
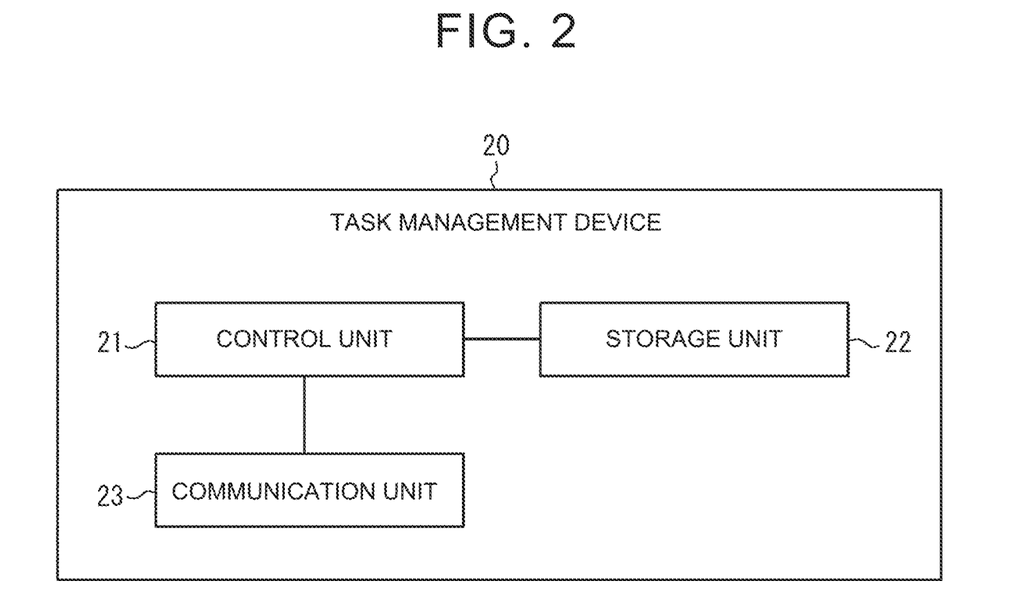
FIG. 2 is a block diagram showing a configuration of a task management device according to the embodiment of the present disclosure.

The configuration of the task management device 20 according to the present embodiment will be described with reference to FIG. 2.

The task management device 20 includes a control unit 21, a storage unit 22, and a communication unit 23.

The control unit 21 includes at least one processor, at least one programmable circuit, at least one dedicated circuit, or any combination thereof. The processor is a general-purpose processor such as a CPU or a GPU, or a dedicated processor specialized for a specific process. The term "CPU" is an abbreviation for "central processing unit". The term "GPU" is an abbreviation for "graphics processing unit". The programmable circuit is, for example, an FPGA. The term "FPGA" is an abbreviation for "field-programmable gate array". The dedicated circuit is, for example, an ASIC. The term "ASIC" is an abbreviation for "application specific integrated circuit". The control unit 21 executes processes related to the operation of the task management device 20 while controlling various units of the task management device 20.

The storage unit 22 includes at least one semiconductor memory, at least one magnetic memory, at least one optical memory, or any combination thereof. The semiconductor memory is, for example, a RAM, a ROM, or a flash memory. The term "RAM" is an abbreviation for "random access memory". The term "ROM" is an abbreviation for "read-only memory". The RAM is, for example, an SRAM or a DRAM. The term "SRAM" is an abbreviation for "static random access memory". The term "DRAM" is an abbreviation for "dynamic random access memory". The ROM is, for example, an EEPROM. The term "EEPROM" is an abbreviation for "electrically erasable programmable read only memory". The flash memory is, for example, an SSD. The term "SSD" is an abbreviation for solid-state drive. The magnetic memory is, for example, an HDD. The term "HDD" is an abbreviation for hard disk drive. The storage unit 22 functions as, for example, a main storage device, an auxiliary storage device, or a cache memory. The storage unit 22 stores data used for the operation of the task management device 20 and data acquired through the operation of the task management device 20.

The communication unit 23 includes at least one communication interface. The communication interface is, for example, an interface compatible with wired local area network (LAN) communication standards such as Ethernet (registered trademark), or an interface compatible with wireless LAN communication standards such as IEEE802. 11. The term "IEEE" is an abbreviation for Institute of Electrical and Electronics Engineers. The communication unit 23 communicates with the vehicle 30, the first terminal device 40, and the second terminal device 50. The communication unit 23 receives the data used for the operation of the task management device 20, and transmits the data acquired through the operation of the task management device 20.

The function of the task management device 20 is realized by executing the program according to the present embodiment with the processor serving as the control unit 21. That is, the function of the task management device 20 is realized by software. The program causes the computer to perform the operation of the task management device 20 such that the computer functions as the task management device 20. That is, the computer functions as the task management device 20 by performing the operation of the task management device 20 in accordance with the program.

The program can be stored in a non-transitory computer-readable medium. The non-transitory computer-readable medium is, for example, a flash memory, a magnetic recording device, an optical disc, an opto-magnetic recording medium, or a ROM. The distribution of the program is carried out, for example, by selling, transferring, or renting a portable medium such as an SD card, a DVD, or a CD-ROM in which the program is stored. The term "SD" is an abbreviation for "secure digital". The term "DVD" is an abbreviation for "digital versatile disc". The term "CD-ROM" is an abbreviation for "compact disc read only memory". The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the processing of the computer corresponds to the "data equivalent to a program".

A part or all of the functions of the task management device 20 may be realized by a programmable circuit or a dedicated circuit serving as the control unit 21. That is, a part or all of the functions of the task management device 20 may be realized by hardware.

Figure 3:
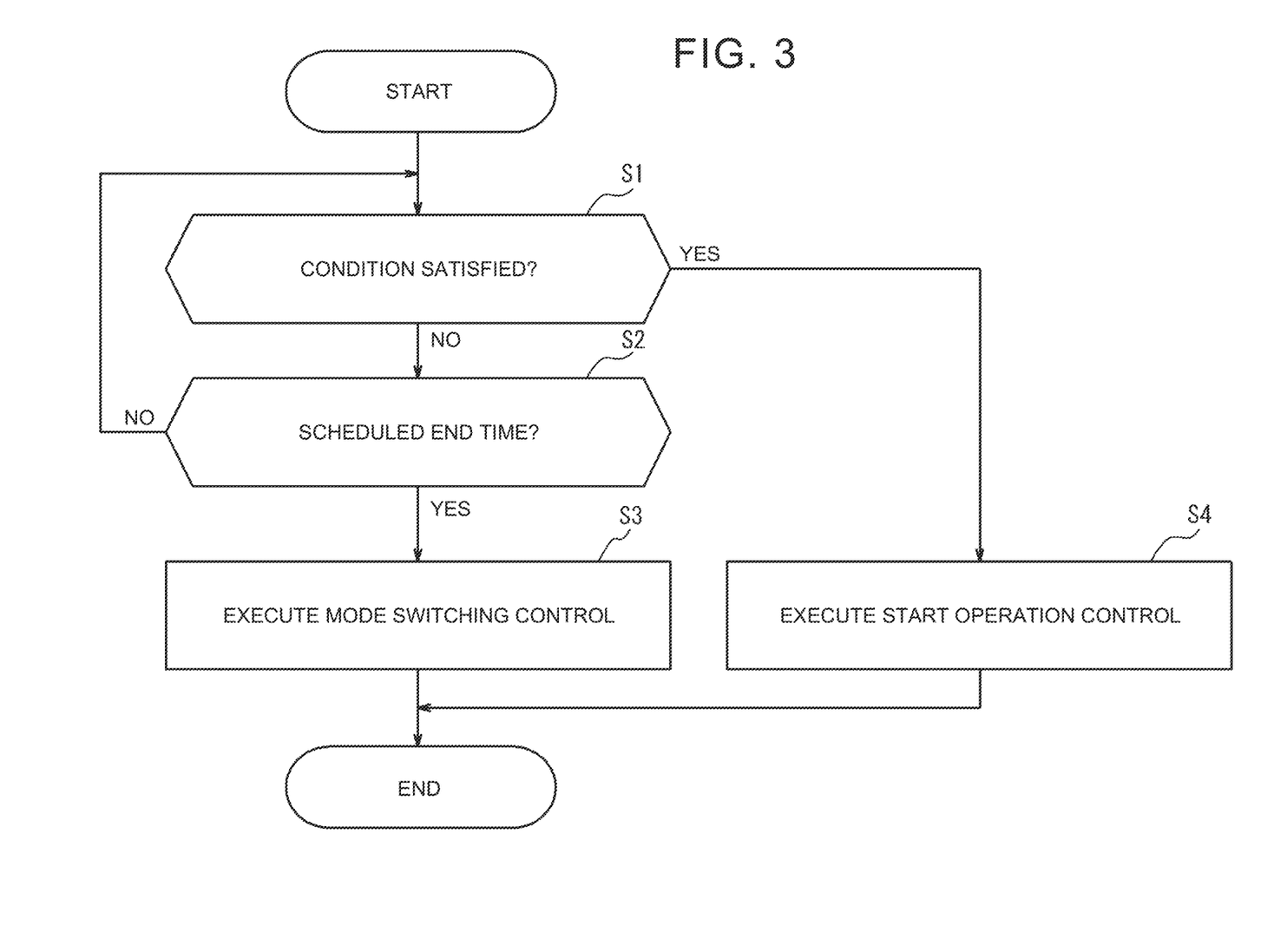
FIG. 3 is a flowchart showing an operation of the task management device according to the embodiment of the present disclosure.

The operation of the task management device 20 according to the present embodiment will be described with reference to FIG. 3. This operation corresponds to a task management method according to the present embodiment.

In step S1, the control unit 21 of the task management device 20 determines whether a specific condition Ci is satisfied during the period P1 in which the vehicle 30 is operated in the first mode M1. When the control unit 21 determines that the specific condition Ci is not satisfied, the process in step S2 is executed. When the control unit 21 determines that the specific condition Ci is satisfied, that is, when satisfaction of the specific condition Ci is detected, the process in step S4 is executed. Specifically, satisfaction of the specific condition Ci is detected by any one of the following procedures.

In a first procedure, the specific condition Ci includes a condition C1 that the second user 12 pays an additional fee for using the vehicle 30 before the scheduled end time of the period P1. The second user 12 can use the second terminal device 50 to perform an operation to pay the additional fee. When such an operation is performed, the second terminal device 50 transmits first notification data Dn1 that notifies the task management device 20 that the second user 12 has paid the additional fee to the task management device via a communication interface that is implemented in the second terminal device 50 and is compatible with mobile communication standards such as LTE, 4G standards, or 5G standards, wireless LAN communication standards such as IEEE 802.11, or wired LAN communication standards such as Ethernet (registered trademark). The term "LTE" is an abbreviation for "long term evolution". The term "4G" is an abbreviation for "fourth generation". The term "5G" is an abbreviation for "fifth generation". For example, the second user 12 may be able to access a website on the Internet operated by the business operator that manages the vehicle 30 and pay the additional fee. The first notification data Dn1 may be transmitted to the task management device 20 through the above website.

The control unit 21 of the task management device 20 receives the first notification data Dn1 from the second terminal device 50 via the communication unit 23. The control unit 21 refers to the received first notification data Dn1 and detects that the condition C1 is satisfied.

In a second procedure, the specific condition Ci includes a condition C2 that the application corresponding to the first mode M1 is the sale of products and that the second user 12 purchases the remaining products. When the application corresponding to the first mode M1 is the sale of products such as bread, the second user 12 can purchase the remaining products such as unsold bread using the second terminal device 50. When such an operation is performed, the second terminal device 50 transmits second notification data Dn2 that notifies the task management device 20 that the second user 12 has purchased the remaining products to the task management device 20 via a communication interface implemented in the second terminal device 50. For example, the second user 12 may be able to access a website on the Internet operated by the first user 11, such as a mobile vendor, and purchase the remaining products. The second notification data Dn2 may be transmitted to the task management device 20 through the above website.

The control unit 21 of the task management device 20 receives the second notification data Dn2 from the second terminal device 50 via the communication unit 23. The control unit 21 refers to the received second notification data Dn2 and detects that the condition C2 is satisfied.

In a third procedure, the specific condition Ci includes a condition C3 that the application corresponding to the first mode M1 is the provision of accommodations and that the first user 11 checks out. When the application corresponding to the first mode M1 is the provision of accommodations and the first user 11 is a guest, the first user 11 can perform a checkout operation using the first terminal device 40. When such an operation is performed, the first terminal device 40 transmits third notification data Dn3 that notifies the task management device 20 that the first user 11 has checked out to the task management device 20 via a communication interface that is implemented in the first terminal device 40 and is compatible with mobile communication standards such as LTE, 4G standards, or 5G standards, wireless LAN communication standards such as IEEE 802.11, or wired LAN communication standards such as Ethernet (registered trademark) 20. For example, the first user 11 may be able to check out by accessing a website on the Internet operated by a business operator such as a hotel company. The third notification data Dn3 may be transmitted to the task management device 20 through the above website.

The control unit 21 of the task management device 20 receives the third notification data Dn3 from the first terminal device 40 via the communication unit 23. The control unit 21 refers to the received third notification data Dn3 and detects that the condition C3 is satisfied.

In a fourth procedure, the specific condition Ci includes a condition C4 that the application corresponding to the first mode M1 is the provision of services requiring appointments and that the first user 11 cancels the appointment. When the application corresponding to the first mode M1 is the provision of medical services, beauty services, or other services requiring appointments, and the first user 11 is a service user such as a patient or a customer, the first user 11 can cancel the appointment using the first terminal device 40. When such an operation is performed, the first terminal device 40 transmits the fourth notification data Dn4 that notifies the task management device 20 that the first user 11 has canceled the appointment to the task management device 20 via a communication interface implemented in the first terminal device 40. For example, the first user 11 may be able to cancel the appointment by accessing a website on the Internet operated by a service provider such as a medical institution or a beauty salon. The fourth notification data Dn4 may be transmitted to the task management device 20 through the above website.

The control unit 21 of the task management device 20 receives the fourth notification data Dn4 from the first terminal device 40 via the communication unit 23. The control unit 21 refers to the received fourth notification data Dn4 and detects that the condition C4 is satisfied.

In a fifth procedure, the specific condition Ci includes a condition C5 that the application corresponding to the first mode M1 is the delivery of articles and that the space in the vehicle 30 where the delivered articles have been housed becomes available. When the application corresponding to the first mode M1 is the delivery of articles such as packages, the vehicle 30 captures an image of the inside of the vehicle 30 using a camera mounted on the vehicle 30. The vehicle 30 transmits the captured image to the task management device 20 via a communication interface that is mounted on the vehicle 30 and is compatible with mobile communication standards such as LTE, the 4G standard, or the 5G standard, V2X communication standards such as DSRC or cellular V2X, or wireless LAN communication standards such as IEEE 802.11. The term "DSRC" is an abbreviation for "dedicated short range communications". The term "V2X" is an abbreviation for "vehicle-to-everything".

The control unit 21 of the task management device 20 receives the image of the inside of the vehicle 30 from the vehicle 30 via the communication unit 23. The control unit 21 determines whether the space in the vehicle 30 becomes available by analyzing the received image. As a method of image analysis, a known method can be used. Machine learning such as deep learning may be used. The determination that the space in the vehicle 30 becomes available corresponds to the detection that the condition C5 is satisfied.

In a sixth procedure, the specific condition Ci includes a condition C6 that the application corresponding to the first mode M1 is the transportation of passengers and that the space in the vehicle 30 where the transported passengers have been accommodated becomes available. When the application corresponding to the first mode M1 is the transportation of passengers, the vehicle 30 captures an image of the inside of the vehicle 30 using a camera mounted on the vehicle 30. The vehicle 30 transmits the captured image to the task management device 20 via the communication interface mounted on vehicle 30.

The control unit 21 of the task management device 20 receives the image of the inside of the vehicle 30 from the vehicle 30 via the communication unit 23. The control unit 21 determines whether the space in the vehicle 30 becomes available by analyzing the received image. As a method of image analysis, a known method can be used. Machine learning such as deep learning may be used. The determination that the space in the vehicle 30 becomes available corresponds to the detection that the condition C6 is satisfied.

In a seventh procedure, the specific condition Ci includes a condition C7 that the application corresponding to the first mode M1 is the sale of products and that the space in the vehicle 30 where the products sold have been housed becomes available. When the application corresponding to the first mode M1 is the sale of products such as bread, the vehicle 30 captures an image of the inside of the vehicle 30 using a camera mounted on the vehicle 30. The vehicle 30 transmits the captured image to the task management device 20 via the communication interface mounted on vehicle 30.

The control unit 21 of the task management device 20 receives the image of the inside of the vehicle 30 from the vehicle 30 via the communication unit 23. The control unit 21 determines whether the space in the vehicle 30 becomes available by analyzing the received image. As a method of image analysis, a known method can be used. Machine learning such as deep learning may be used. The determination that the space in the vehicle 30 becomes available corresponds to the detection that the condition C7 is satisfied.

In step S2, the control unit 21 of the task management device 20 determines whether the scheduled end time of the period P1 has arrived. When the control unit 21 determines that the scheduled end time of the period P1 has not yet arrived, the process in step S1 is executed again. When the control unit 21 determines that the scheduled end time of the period P1 has arrived, that is, when the scheduled end time of the period P1 has arrived, the process in step S3 is executed.

In step S3, the control unit 21 of the task management device 20 executes mode switching control. The mode switching control is control that switches the mode of the vehicle 30 to the second mode M2 that is different from the first mode M1.

Specifically, the control unit 21 of the task management device 20 transmits first instruction data Di1 for instructing the operator to change the interior or the exterior of the vehicle 30 to the interior or the exterior corresponding to the second mode M2 to the terminal device of the operator, such as a mobile phone, a smart phone, or a tablet, via the communication unit 23, thereby executing the mode switching control. Upon receipt of the first instruction data Di1, the terminal device of the operator displays the received first instruction data Di1 on the display or outputs the received first instruction data Di1 by voice from the speaker. The operator changes the interior or the exterior of the vehicle 30 in accordance with the first instruction data Di1 displayed or output by voice. For example, on the assumption that the application corresponding to the second mode M2 is the transportation of passengers, the operator installs rear seats for passengers to be seated or moves rear seats to specific positions. Alternatively, the operator may cause a display provided as part of the exterior of the vehicle 30 to display operation information such as the destination.

When the vehicle 30 has a function of automatically changing the interior or the exterior of the vehicle 30, the control unit 21 of the task management device 20 may execute the mode switching control by transmitting second instruction data Di2 for instructing the vehicle 30 to change the interior or the exterior of the vehicle 30 to the interior or the exterior corresponding to the second mode M2 to the vehicle 30 via the communication unit 23, instead of or in addition to transmission of the first instruction data Di 1 to the terminal device of the operator. In such a modification, the vehicle 30 receives the second instruction data Di2 from the task management device 20 via the communication interface mounted on vehicle 30. The vehicle 30 changes the interior or the exterior of the vehicle 30 in accordance with the received second instruction data Di2. For example, on the assumption that the application corresponding to the second mode M2 is the transportation of passengers, the vehicle 30 moves rear seats for passengers to be seated to specific positions. Alternatively, the vehicle 30 may display the operation information such as the destination on a display provided as part of the exterior of the vehicle 30.

In step S4, the control unit 21 of the task management device 20 executes operation start control before the scheduled end time of the period P1. The operation start control is control to start the operation of the vehicle 30 in the second mode M2. Specifically, the operation start control is any of mode switching control or control to start the operation of the vehicle 30 in both the first mode M1 and the second mode M2. The former control is the same as the mode switching control executed in step S3. When the latter control is executed, the interior or the exterior of the vehicle 30 is partially changed to the interior or the exterior corresponding to the second mode M2 in the same manner as the mode switching control, as necessary.

When satisfaction of the condition C1 is detected in step S1, the control unit 21 of the task management device 20 executes the mode switching control as the operation start control. That is, when the control unit 21 detects that the second user 12 has paid the additional fee during the period P1, the control unit 21 executes control to forcibly switch the mode of the vehicle 30 to the second mode M2 before the scheduled end time of the period P1. Alternatively, the control unit 21 may execute control to start the operation of the vehicle 30 in both the first mode M1 and the second mode M2 as the operation start control. That is, when the control unit 21 detects that the second user 12 has paid the additional fee during the period P1, the control unit 21 may execute control to start the operation of the vehicle 30 in both the first mode M1 and the second mode M2 before the scheduled end time of the period P1. For example, on the assumption that the application corresponding to the second mode M2 is the sale of products such as bread or the delivery of articles such as packages, the second user 12 can use the vehicle 30 early by paying the additional fee under the circumstance that the second user 12 has more products to sell or more products to deliver than expected, for example.

When satisfaction of the condition C2 is detected in step S1, the control unit 21 of the task management device 20 executes the mode switching control as the operation start control. That is, in the case where the application corresponding to the first mode M1 is the sale of products such as bread, when the control unit 21 detects that the second user 12 has purchased the remaining products during the period P1, the control unit 21 executes control to forcibly switch the mode of the vehicle 30 to the second mode M2 before the scheduled end time of the period P1. Therefore, the second user 12 can start using the vehicle 30 early by purchasing the remaining products such as unsold bread.

When satisfaction of the condition C3 is detected in step S1, the control unit 21 of the task management device 20 executes the mode switching control as the operation start control. That is, in the case where the application corresponding to the first mode M1 is the provision of accommodations and the first user 11 is a guest, when the control unit 21 detects that the first user 11 has checked out during the period P1, the control unit 21 executes control to forcibly switch the mode of the vehicle 30 to the second mode M2 before the scheduled end time of the period P1. Therefore, the second user 12 can start using the vehicle 30 early when the first user 11 checks out early.

When satisfaction of the condition C4 is detected in step S1, the control unit 21 of the task management device 20 executes the mode switching control as the operation start control. That is, in the case where the application corresponding to the first mode M1 is the provision of medical services, beauty services, or other services requiring appointments, and the first user 11 is a service user such as a patient or a customer, when the control unit 21 detects that the first user 11 has canceled the appointment during the period P1, the control unit 21 executes control to forcibly switch the mode of the vehicle 30 to the second mode M2 before the scheduled end time of the period P1. Therefore, the second user 12 can start using the vehicle 30 early when the first user 11 cancels the appointment early.

When satisfaction of the condition C5 is detected in step S1, the control unit 21 of the task management device 20 executes control to start the operation of the vehicle 30 in both the first mode M1 and the second mode M2 as the operation start control. That is, in the case where the application corresponding to the first mode M1 is the delivery of articles such as packages, when the control unit 21 detects that the delivery of one or more articles is completed and the space in the vehicle 30 where the one or more articles have been housed becomes available during the period P1, the control unit 21 executes control to start the operation of the vehicle 30 in both the first mode M1 and the second mode M2 before the scheduled end time of the period P1. For example, when the application corresponding to the second mode M2 is the transportation of passengers, the excess space inside the vehicle 30 can be effectively used to transport the passengers.

When satisfaction of the condition C6 is detected in step S1, the control unit 21 of the task management device 20 executes control to start the operation of the vehicle 30 in both the first mode M1 and the second mode M2 as the operation start control. That is, in the case where the application corresponding to the first mode M1 is the transportation of passengers, when the control unit 21 detects that the transportation of one or more passengers is completed and the space in the vehicle 30 where the one or more passengers have been accommodated becomes available during the period P1, the control unit 21 executes control to start the operation of the vehicle 30 in both the first mode M1 and the second mode M2 before the scheduled end time of the period P1. For example, when the application corresponding to the second mode M2 is the delivery of articles, the excess space inside the vehicle 30 can be effectively used to deliver the articles.

When satisfaction of the condition C7 is detected in step S1, the control unit 21 of the task management device 20 executes control to start the operation of the vehicle 30 in both the first mode M1 and the second mode M2 as the operation start control. That is, in the case where the application corresponding to the first mode M1 is the sale of products such as bread, when the control unit 21 detects that the sale of one or more products is completed and the space in the vehicle 30 where the one or more products have been housed becomes available during the period P1, the control unit 21 executes control to start the operation of the vehicle 30 in both the first mode M1 and the second mode M2 before the scheduled end time of the period P1. For example, when the application corresponding to the second mode M2 is the transportation of passengers, the excess space inside the vehicle 30 can be effectively used to transport the passengers.

In the case where the control unit 21 of the task management device 20 executes control to start the operation of the vehicle 30 in both the first mode M1 and the second mode M2 in step S4, when the scheduled end time of the period P1 arrives, the control unit 21 executes the mode switching control.

As a modification of the present embodiment, the task management device 20 may be provided in the vehicle 30.

A part of the embodiment of the present disclosure is shown as an example below. However, it should be noted that embodiment of the present disclosure is not limited to these.

Appendix 1
A task management device includes a control unit that executes, when satisfaction of a specific condition is detected during a period in which a vehicle to be operated in a mode corresponding to an application is operated in a first mode, operation start control to start an operation of the vehicle in a second mode that is different from the first mode before a schedule end time of the period.

Appendix 2
In the task management device according to Appendix 1, the vehicle is used by a first user when the vehicle is operated in the first mode, and is used by a second user different from the first user when the vehicle operated in the second mode.

Appendix 3
In the task management device according to Appendix 2, the control unit executes mode switching control that switches the mode of the vehicle to the second mode as the operation start control.

Appendix 4
In the task management device according to Appendix 2, the control unit executes control to start an operation of the vehicle in both the first mode and the second mode as the operation start control.

Appendix 5
In the task management device according to any one of Appendices 2 to 4, the specific condition includes a condition that the second user pays an additional fee for using the vehicle before the scheduled end time of the period.

Appendix 6
In the task management device according to Appendix 3, the specific condition includes a condition that the application corresponding to the first mode is sale of products and that the second user purchases the remaining products.

Appendix 7
In the task management device according to Appendix 3, the specific condition includes a condition that the application corresponding to the first mode is provision of an accommodation and that the first user checks out.

Appendix 8
In the task management device according to Appendix 3, the specific condition includes a condition that the application corresponding to the first mode is provision of a service requiring an appointment and that the first user cancels the appointment.

Appendix 9
In the task management device according to Appendix 4, the specific condition includes a condition that the application corresponding to the first mode is delivery of an article and that a space in the vehicle where the delivered article has been housed becomes available.

Appendix 10
In the task management device according to Appendix 4, the specific condition includes a condition that the application corresponding to the first mode is transportation of a passenger and that a space in the vehicle where the transported passenger has been accommodated becomes available.

Appendix 11
In the task management device according to Appendix 4, the specific condition includes a condition that the application corresponding to the first mode is sale of a product and that a space in the vehicle where the product sold has been housed becomes available.

Appendix 12
A vehicle includes the task management device according to any one of Appendices 1 to 11.

Appendix 13
A task management method includes executing, when satisfaction of a specific condition is detected during a period in which a vehicle to be operated in a mode corresponding to an application is operated in a first mode, operation start control to start an operation of the vehicle in a second mode that is different from the first mode by a control unit before a schedule end time of the period.

Appendix 14
In the task management method according to Appendix 13, the vehicle is used by a first user when the vehicle is operated in the first mode, and is used by a second user different from the first user when the vehicle operated in the second mode.

Appendix 15
In the task management method according to Appendix 14, the operation start control is mode switching control that switches the mode of the vehicle to the second mode.

Appendix 16

In the task management method according to Appendix 14, the operation start control is control to start an operation of the vehicle in both the first mode and the second mode.

Appendix 17

In the task management method according to any one of Appendices 14 to 16, the specific condition includes a condition that the second user pays an additional fee for using the vehicle before the scheduled end time of the period.

Appendix 18

In the task management method according to Appendix 15, the specific condition includes a condition that the application corresponding to the first mode is sale of products and that the second user purchases the remaining products.

Appendix 19

In the task management method according to Appendix 15, the specific condition includes a condition that the application corresponding to the first mode is provision of an accommodation and that the first user checks out or a condition that the application corresponding to the first mode is provision of a service requiring an appointment and that the first user cancels the appointment.

Appendix 20

In the task management method according to Appendix 16, the specific condition includes a condition that the application corresponding to the first mode is delivery of an article and that a space in the vehicle where the delivered article has been housed becomes available, a condition that the application corresponding to the first mode is transportation of a passenger and that a space in the vehicle where the transported passenger has been accommodated becomes available, or a condition that the application corresponding to the first mode is sale of a product and that a space in the vehicle where the product sold has been housed becomes available.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. A task management device, comprising:
a processor configured to,
in response to satisfaction of a specific condition detected during a period in which a vehicle to be operated in a mode corresponding to an application is operated in a first mode, execute operation start control to start an operation of the vehicle in a second mode that is different from the first mode before a schedule end time of the period,
execute mode switching control that switches the mode of the vehicle to the second mode as the operation start control, and
in response to executing the mode switching control, change an interior or an exterior of the vehicle corresponding to the second mode, wherein
the vehicle is used by a first user when the vehicle is operated in the first mode, and is used by a second user different from the first user when the vehicle is operated in the second mode, and the specific condition includes a condition that the application corresponding to the first mode is sale of products and that the second user purchases a remainder of the products.

2. The task management device according to claim 1, wherein
the processor is configured to execute control to start the operation of the vehicle in both the first mode and the second mode as the operation start control.

3. The task management device according to claim 2, wherein
the specific condition further includes a condition that the application corresponding to the first mode is delivery of an article and that a space in the vehicle where the article has been housed becomes available.

4. The task management device according to claim 2, wherein
the specific condition further includes a condition that the application corresponding to the first mode is transportation of a passenger and that a space in the vehicle where the passenger has been accommodated becomes available.

5. The task management device according to claim 2, wherein
the specific condition further includes a condition that the application corresponding to the first mode is sale of a product and that a space in the vehicle where the product has been housed becomes available.

6. The task management device according to claim 1, wherein
the specific condition further includes a condition that the second user pays an additional fee for using the vehicle before the schedule end time of the period.

7. The task management device according to claim 1, wherein
the specific condition further includes a condition that the application corresponding to the first mode is provision of an accommodation and that the first user checks out.

8. The task management device according to claim 1, wherein
the specific condition further includes a condition that the application corresponding to the first mode is provision of a service requiring an appointment and that the first user cancels the appointment.

9. The task management device according to claim 1, wherein
the vehicle is a mounted vehicle including:
a floor structure including a plurality of rails, and
at least one of
rear seats configured to be freely removed or moved, by using the plurality of rails, or
a table configured to be freely installed without tools, by using the plurality of rails.

10. A vehicle, comprising:
a task management device including
a processor configured to,
in response to satisfaction of a specific condition detected during a period in which the vehicle to be operated in a mode corresponding to an application is operated in a first mode, execute operation start control to start an operation of the vehicle in a second mode that is different from the first mode before a schedule end time of the period,
execute mode switching control that switches the mode of the vehicle to the second mode as the operation start control, and in response to executing the mode switching control, change an interior or an exterior of the vehicle corresponding to the second mode, wherein the vehicle is used by a first user when the vehicle is operated in the first mode, and is used by a second user different from the first user when the vehicle is operated in the second mode, and the specific condition includes a condition that the application corresponding to the first mode is sale of products and that the second user purchases a remainder of the products.

11. The vehicle according to claim 10, wherein
the vehicle is a mounted vehicle including:
   a floor structure including a plurality of rails, and
   at least one of
      rear seats configured to be freely removed or moved, by using the plurality of rails, or
      a table configured to be freely installed without tools, by using the plurality of rails.

12. A task management method, comprising:
in response to satisfaction of a specific condition detected during a period in which a vehicle to be operated in a mode corresponding to an application is operated in a first mode, executing operation start control to start an operation of the vehicle in a second mode that is different from the first mode by a control unit before a schedule end time of the period, executing mode switching control that switches the mode of the vehicle to the second mode as the operation start control, and in response to executing the mode switching control, changing an interior or an exterior of the vehicle corresponding to the second mode, wherein the vehicle is used by a first user when the vehicle is operated in the first mode, and is used by a second user different from the first user when the vehicle is operated in the second mode, and the specific condition includes a condition that the application corresponding to the first mode is sale of products and that the second user purchases a remainder of the products.

13. The task management method according to claim 12, wherein
the specific condition further includes a condition that the second user pays an additional fee for using the vehicle before the schedule end time of the period.

14. The task management method according to claim 12, wherein
the specific condition further includes a condition that the application corresponding to the first mode is provision of an accommodation and that the first user checks out or a condition that the application corresponding to the first mode is provision of a service requiring an appointment and that the first user cancels the appointment.

15. The task management method according to claim 12, wherein
the specific condition further includes a condition that the application corresponding to the first mode is delivery of an article and that a space in the vehicle where the article has been housed becomes available, a condition that the application corresponding to the first mode is transportation of a passenger and that a space in the vehicle where the passenger has been accommodated becomes available, or a condition that the application corresponding to the first mode is sale of a product and that a space in the vehicle where the product has been housed becomes available.

16. The task management method according to claim 12, wherein
the vehicle is a mounted vehicle including:
   a floor structure including a plurality of rails, and
   at least one of
      rear seats configured to be freely removed or moved, by using the plurality of rails, or
      a table configured to be freely installed without tools, by using the plurality of rails.

\* \* \* \* \*